United States Patent [19]
Farlow, Jr.

[11] Patent Number: 5,833,295
[45] Date of Patent: Nov. 10, 1998

[54] TOTALLY MOBILE KITCHEN

[76] Inventor: James M. Farlow, Jr., 1201 Piney Forest Rd., Danville, Va. 24540

[21] Appl. No.: 753,404

[22] Filed: Nov. 25, 1996

[51] Int. Cl.$^6$ .................................................... B60P 3/025
[52] U.S. Cl. ............................................ 296/24.1; 296/22
[58] Field of Search ...................... 296/22, 24.1, 26.01, 296/26.15, 26.12, 181; 52/68

[56] References Cited

U.S. PATENT DOCUMENTS

| | | | |
|---|---|---|---|
| 4,601,509 | 7/1986 | Ellis, Sr. ........................................ | 296/22 |
| 4,632,836 | 12/1986 | Abbott et al. ........................... | 296/22 X |

FOREIGN PATENT DOCUMENTS

| | | | |
|---|---|---|---|
| 2547-249 | 4/1977 | Germany ................................. | 296/22 |
| 406099771 A | 4/1994 | Japan ................................... | 296/24.1 |
| 112-527-A | 11/1984 | U.S.S.R. ................................. | 296/22 |

*Primary Examiner*—D. Glenn Dayoan
*Assistant Examiner*—Jason Morrow

*Attorney, Agent, or Firm*—C. Fred Rosenbaum; Woods, Rogers & Hazlegrove, PLC

[57] ABSTRACT

A lightweight mobile kitchen has the capability to be transported to a remote food service site by a small prime mover and quickly be placed in operation by a minimal crew. The kitchen is self contained on a wheeled chassis and is moved as a closed wagon, then the sides and end are opened for cooking. Accessory flexible enclosure material is connected to the wagon sides to provide an enclosure for protection from the elements during service and consumption of food. The efficiency of the cooking operation results from the layout of the various utilities to maximize the individual resources of the cooks. The kitchen has compartmentalized areas for sanitation, food preparation, grilling, convection baking, ovens, and warming. The kitchen is self contained and includes its own fuel, filtration system, potable water, fuel, electric lights, an automatic gas shutoff and a fire suppression system.

13 Claims, 3 Drawing Sheets

TOTALLY MOBILE KITCHEN

BACKGROUND OF THE INVENTION

This invention is directed to a mobile kitchen which can be used to prepare finished meals in an environment devoid of the normal residential services. The kitchen can be used to prepare meals from raw foodstuffs or prepared supplies wherever people gather, e.g. sporting events, and social or business outings. The success of such events depends as much on the catering of food as the other activities. The kitchen provides the caterer with the equipment to prepare a meal comparable with that expected from a permanent kitchen.

The easily transportable kitchen is also well adapted for use in emergency and military operations. The relationship between high morale and hot, normally cooked, meals has been well established by the military. However, in an emergency and/or military situation, a major problem is getting hot food to the small units located in the most extreme positions. The size and weight of the kitchen permit it to be utilized in the forward unprepared positions. The speed with which the kitchen can be emplaced, utilized and struck permit mobile operations on a meal to meal basis, i.e. move in, set up, serve and leave to catch another unit or the same unit at another location for the next meal.

SUMMARY OF THE INVENTION

The primary object of the present invention is to provide a generally improved and more versatile mobile kitchen of the class indicated, particularly designed and adapted to facilitate the preparation and service of full course hot meals to large numbers of people efficiently and safely in a sanitary environment, in a short period of time.

Another object of the invention is to simplify the stowage, transport, and on-site setup, as well as to simplify the operation of the food preparation and service equipment by making all stations more readily accessible to the food preparers and servers engaged in the construction and operation of the mobile kitchen. It is an object of the invention to provide a lightweight self contained kitchen which can be placed in operation by a small prime mover and a minimal crew. The mobile kitchen is built on a trailer chassis suspended on two axles with four ground engaging wheels positioned just behind the center of gravity. It is equipped with a standard trailer hitch with safety chains and electrical connections for towing on highways, or over terrain, and it is equipped with ratchet type leveling jacks for setup on uneven terrain. The mobile kitchen can be driven to the site, and using two cooks, can be ready to prepare meals within thirty minutes.

It is an object of the invention to provide cooked meals for over 300 people within 2 hours using three cooks. The kitchen contains enough fuel, water and supplies for, at least, one meal upon arrival at the site of use. Pots, pans, utensils, supplies, a first aid kit and the like are stowed on board in the enclosed utility room in the front of the mobile kitchen.

It is an object of the invention to provide an enclosure for serving and/or eating the prepared food protected from the elements. The upwardly folding hinged doors along the sides of the mobile kitchen are held in the open position by a system of steel supports and secured in place by hook and chain devices fixed to the doors and the supports. Tent extensions are carried on board to be erected using a system of lightweight quick connect aluminum or PVC (polyvinyl chloride) tubular tent supports or poles. The enclosure is secured to the sides and back of the mobile kitchen doors using snaps and straps affixed to the doors. Each tent extension features a door flap at each end to facilitate personnel movement through the enclosed area.

It is an object of the invention to provide separate cook stations insuring food preparation, cooking, baking and serving activities without interference from each other. The location of the utilities allows the most efficient use of time and space by each cook or helper.

It is an object of the invention to provide a mobile kitchen with separate washing stations for the personnel and the foodstuffs. The mobile kitchen is equipped with an onboard ion exchange and activated carbon water filter system attached between the fill ports and the hot and cold water tanks. Sanitation devices are located at or near each work station, including a hand sink, with hot and cold water supply. In addition, alcohol based hand sanitizers are located throughout the enclosure for easy access of food preparers.

It is an object of the invention to provide a fire suppression system mounted above the cooking areas with a supply tank located in the utility room and separated from the cooking area by a firewall. The kitchen is also equipped with automatic/manual fuel shut off devices on each of the fuel storage tanks.

It is an object of the invention to provide a self contained mobile kitchen that can be transported by land, sea and air. As air cargo, it may be shipped internally or in slings by helicopter.

It is an object of the invention to provide a mobile field kitchen which may be operated with various heating fuels including diesel, jet fuel, propane and gasoline. The kitchen may incorporate AC or DC electrical power either from an established electrical grid, generator or battery. The electrical power may operate some of the kitchen utilities, e.g. ovens and hot water, as well as extraneous appliances, e.g. lights, pumps and fans. Electric connections or buses are located in the utility room and provide easy hook-up to an external power supply.

DETAILED DESCRIPTION OF THE PREFERRED EMBODIMENT

Figure 1:
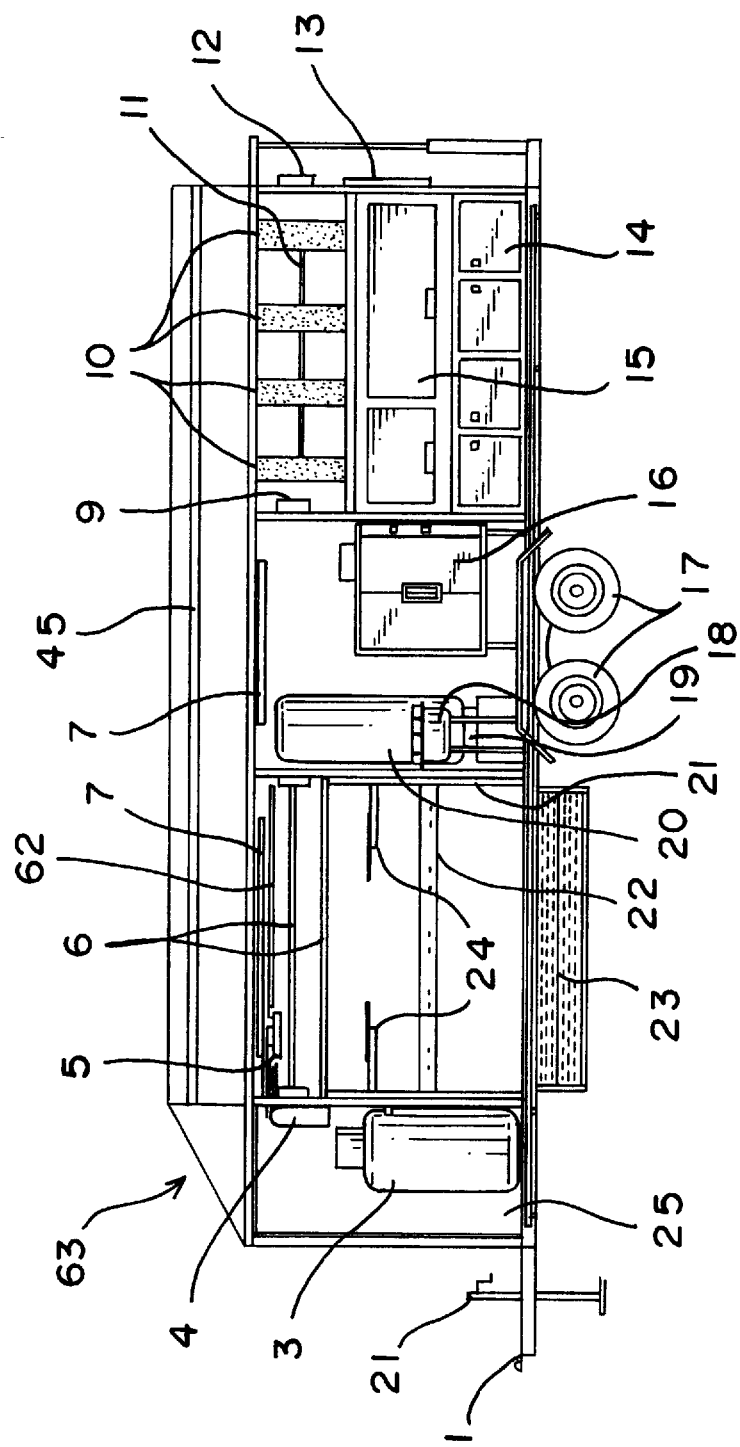
FIG. 1 is a side view of the right side of the kitchen with the side panels raised.
Figure 3:
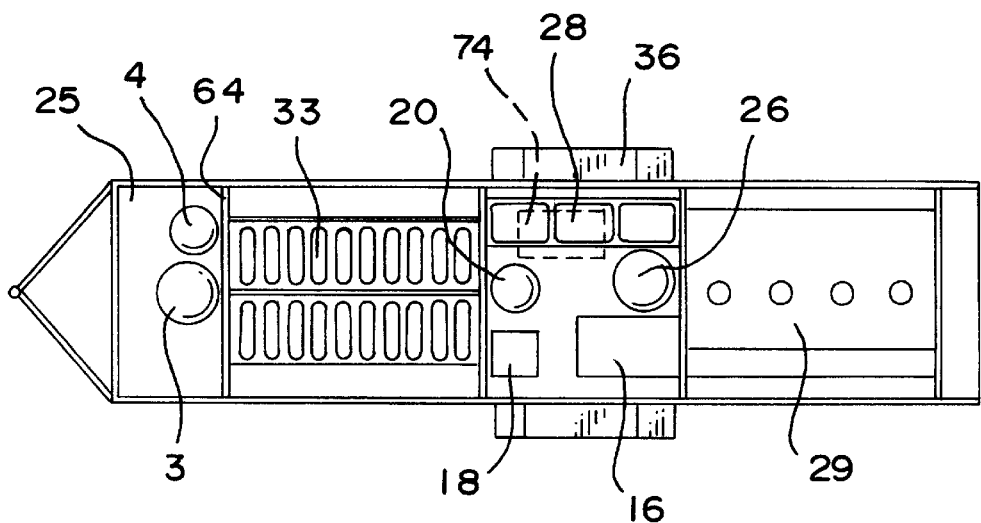
FIG. 3 is a top plan view of the kitchen without the side panels.
Figure 5:
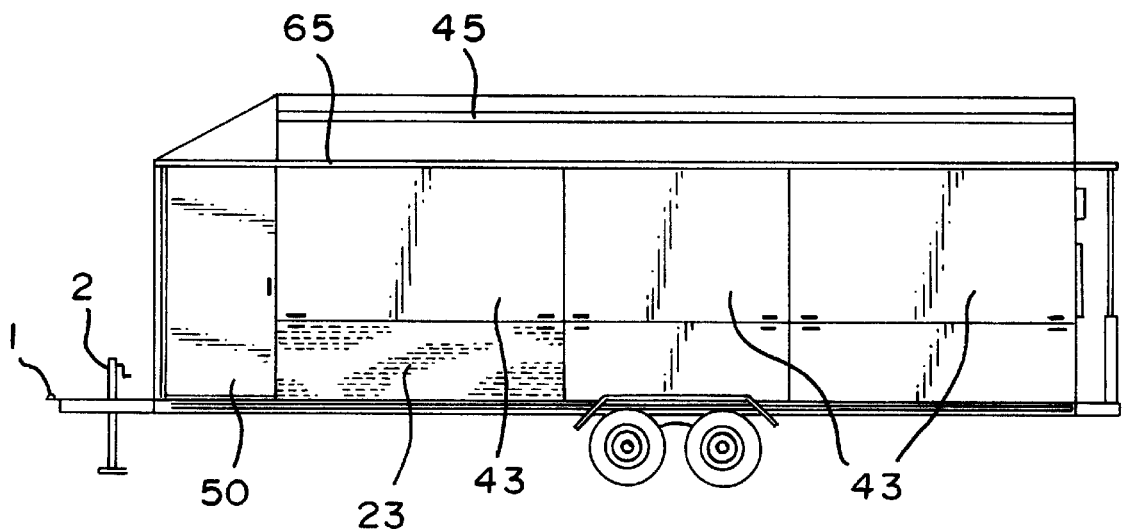
FIG. 5 is a side view with the side panels and deck locked in the travel position.

The mobile kitchen 63 shown from the right side in FIG. 1 is mounted on trailer wheels 17. It is a compartmentalized trailer with side and end panels hinged along the roof line 65 in FIG. 5. These panels are locked down during transportation (shown in FIG. 5) and raised during operation of the kitchen. At the forward end of the vehicle is an enclosed utility room 25 used for storage of cooking utensils, foodstuffs and a tent-like flexible enclosure. Entry to the utility room is through door 50 (FIG. 5) on the right side of the kitchen. An identical door may be located on the left side of the vehicle. At the rear of the utility room is the primary cooking compartment separated from the utility room by firewall 64. The primary cooking compartment is open to both sides of the vehicle. This permits two cooks to work at the burners unimpeded by each other. The primary cooking area contains the 600,000 BTU stove burner array 33 (FIG. 3) and control array 22. Above the burner array are swing arm racks 24 hinged from the fire wall. These racks facilitate the loading and unloading of the food. Located to the rear of the primary cooking compartment is the food preparation area accessible only from the left side of the vehicle. The area is used to receive raw foodstuffs and for cleaning the food in the three bay sink 28. The proximity of the food processing area to the cooking area allows immediate transfer of the food to the cooks while the food preparer remains clear of the cooking area. The next rearward space contains the primary baking compartment housing the baking, roasting and smoking ovens 29.

The mobile kitchen is mounted on a frame which rides on the dual axels and wheel assembly 17 and supports the vehicle. The wheels are covered by fenders 36. The frame has a standard trailer hitch 1 at the forward end. A screw jack leveler 2 is mounted to the frame for support of the forward end of the kitchen when the kitchen is unhitched from the prime mover. Other levelers (not shown) may be attached to the frame to provide stability on uneven ground.

Figure 4:
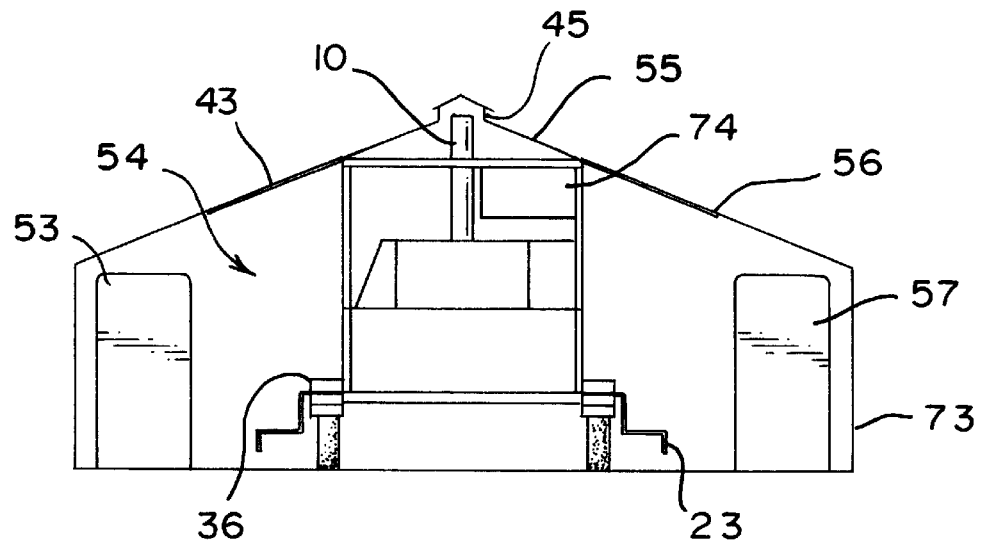
FIG. 4 is a rear view with the side panels raised and enclosure attached.

The mobile kitchen 63 has a continuous roof 55 extending from the utility room to the rear wall of the baking compartment and a vent 45 (FIG. 4). The roof 55 is composed of an upper roof which slants downwardly a short distance on both sides of the centerline and a lower roof which is vertically spaced downwardly from the upper roof. A longitudinal vent 45 is formed by this discontinuity between the upper roof and the lower roof. The size of the vent allows for a large volume of mixing of fresh air with the smoke, smell and heat produced by the kitchen. The lowest edge of the upper roof overlaps the highest edge of the lower roof. The vent 45 may have a mesh material extending between the upper and lower roofs. The lower roof slants downwardly and ends at longitudinal edge which may be even with the upper edge of the side panels (not shown) or extended a short distance beyond the side panels, as shown in FIG. 4

The rear of the mobile kitchen has a rear panel 100 extending across its width that swings upwardly through a hinge attached to the rear wall of the kitchen by extension 66. The rear panel 100 provides overhead protection for a bakers station during operation of the kitchen. The rear panel is attached to a hinged support platform 67 during transportation of the kitchen. In operation the support platform 67 provides planar support for the person working at the station. The platform 67 may be a metal grating material which is lightweight but strong enough to support the user. The grating also provides a safe non-slip surface in all weather conditions. The baker's station includes a rolling/butcher board 13 attached to the rear wall through a hinge.

Figure 2:
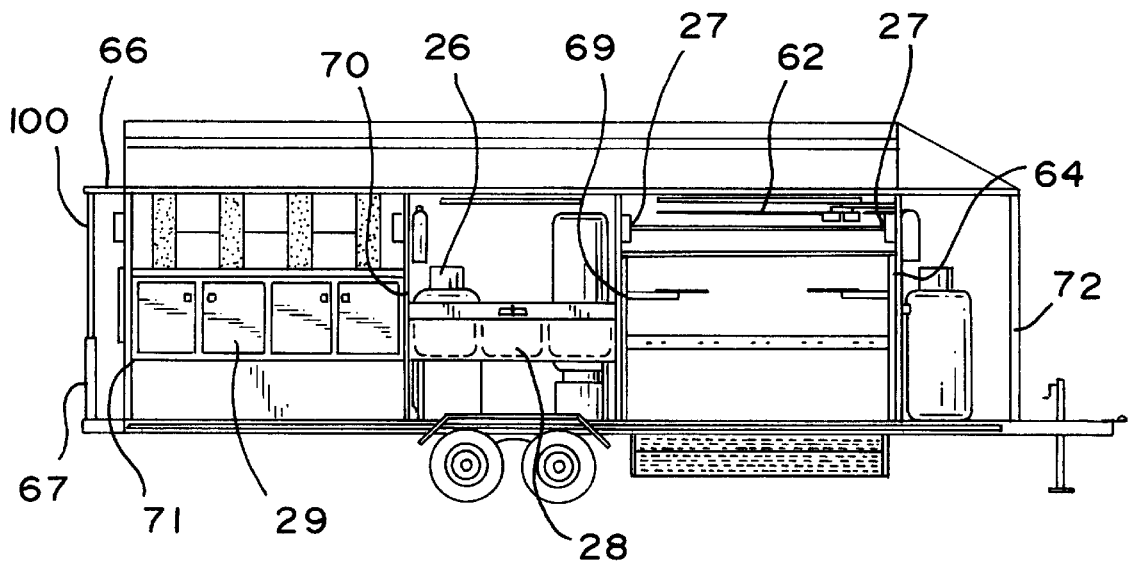
FIG. 2 is a side view of the left side of the kitchen with the side panels raised.

On the other side of the rear wall forward of the baker's station are the baking ovens 29. The location of the baker's station separates the baker and the baking operation from the other cooks and food preparers. The baking ovens 29 enclose approximately 110 square feet with 80 T racks and are capable of 320,000 BTUs. For flexibility, there are several separate ovens mounted together. Four oven doors are shown in FIG. 1. The ovens have swing out doors 15 , shown in FIG. 1, and a modification shown in FIG. 2. The ovens may be used for baking, roasting, smoking and warming of various foodstuffs or prepared foods. The interior of the ovens have conventional vertically adjustable spaced racks. Each oven has a flue 10 which directs the oven exhaust to the area of the vent 45. The damper system 11 controls the flow of smoke and exhaust gases from the oven flue 10. Located under the ovens is a storage compartment entered through doors 14 facing the right side of the vehicle.

Forward of the ovens, in the food preparation area there is a large fuel tank 26 for supply of the ovens 29. In the embodiment shown, the fuel tank may hold 200 pounds of Propane. However, the tank may be designed in a different shape, may be mounted horizontally, and may hold other fuels. The tank may be permanently affixed to the frame with re-filling fittings or it may be removably mounted on the frame. The tank and it's fittings are accessible from the right side of the kitchen. There is a water hook up or fill port 21. Not shown is a conventional filtering system located between the water fill port and the outlets in the sinks 18 and 28. Also located in the food preparation area is a hot water tank 20. The hot water tank is shown as a vertically mounted cylinder but may be designed in different configurations. The hot water tank 20, as shown, has a gas heated 40 gallon capacity. The gas heated hot water tank has a gas shut off system 19. It may be fueled from the adjacent fuel tank or may be electrically heated. The hot water is directed to the large three bay food preparation sink 28 and the smaller personnel sink 18. The large sink 28 is accessible from the left side of the kitchen and the personnel sink 18 is accessible from the right side of the kitchen. Located above the sink 28 is the 55 gallon cold water tank 74 (shown in FIGS. 3 and 5). The conventional plumbing between the fill port, the tanks and the sink faucets is not shown. The faucets of sinks 18 and 28 can also mix unheated water at the outlet. The combined weight of the full fuel and water tanks is placed in the area above the dual axels to provide better handling characteristics during transport of the kitchen.

As shown in FIG. 1, a convection oven 16 is mounted in the food preparation area with access from the right side of the kitchen. The convection oven, illustrated, is operatively connected to a source of heat capable of 80,000 BTU output.

The food preparation area and adjacent areas are illuminated by florescent lighting 7. The lighting is connected to the lower roof trusses (not shown) and can be powered by battery, generator or electric grid. In this lighting location there may be a multiple electrical outlet for additional area lighting or other extraneous electrical appliances. The electrical bus providing the capability to hook the kitchen to other sources of electricity may be located in the utility room 25. The electrical bus is also the interface to the electrical wiring circuit for the mobile kitchen from which all the electrical components of the kitchen receive their power.

Forward of the food preparation area is the primary cooking area. The cooking area has a continuous cooking surface grill of approximately 46 square feet. Mounted below the grill is an array of burners 33. The individual burners may be separately controlled or ganged in sub-sets of the array 33 to allow portions of the grill to be heated or heated at different temperatures. The burners 33 may be configured to use Propane, diesel fuel, jet fuel, alcohol, gasoline or may be in the form of electrical heating elements. The burners 33 are supplied from the tank 3 located in the utility room 25. The tank 3 also has a gas shut off valve assembly (not shown).

Mounted vertically above the burners are forward swing arm racks and aft swing arm racks 24. The left side set of swing arm racks are shown in FIG. 1. Another identical set is located on the right side of the kitchen. These swing arm racks move in the horizontal plane and allow food to be placed closer or farther away from the burners, as necessary. Mounted above the swing arm racks are warming racks 6, as shown in FIG. 1. These racks 6 may be a series of rods extending across the cooking area or they may be in the form of a grill. These racks may be used to keep serving trays of already cooked food warm until the trays can be placed in the serving line. The peripheral lip of the serving tray cooperates with the rods to suspend the tray in the cooking area.

Positioned above the warming racks are two sets of high intensity flood lights 5. These lights are mounted on a movable arm, one on each side of the kitchen. The lights are individually controlled to illuminate either side of the kitchen and can be manipulated for best results.

The fire suppression system is located in the cooking area at a height sufficient to be above the working space and to provide the greatest dispersion of the fire suppression material. The fire suppression system has a supply line 62 which extends most of the length of the cooking area. The supply line is connected to the reservoir 4, shown in FIG. 2, and multiple nozzles along the supply line 62. The fire suppression system has an automatic (thermostatic) triggering mechanism (not shown) and can be activated manually. Upon activation of the fire suppression system the nozzles diffuse the fire suppression material to cover the cooking area and shut off the Propane.

Florescent lighting 7 is also provided in the cooking area. The fixtures are connected to the roof trusses (not shown) above the cooking area.

A cooking platform is connected to the chassis below the cooking area on both sides of the kitchen. The platform 23, as shown, has an upper level, a vertical riser and a lower level. The cooking platform is hingedly fastened to the frame so that in transport, the platform is stowed inside the side panels. During cooking operations, the platform is deployed providing a non-skid grid surface for the cooks.

The chassis and the roof are connected together through vertical framing members. The forward framing member 72 supports the front end wall of the utility room 25. Framing member 64 is in the form of a bulkhead forming the fire wall between the utility room 25 and the cooking area. The bulkhead is connected to and supports the forward end of the burner array 33, the swing arm trays, the forward end of the warming racks, the high intensity flood lights and the fire suppression supply line. Framing member 69 is also in the form of a bulkhead and supports the aft end of the burner array 33, the aft swing arm trays, and the aft end of the warming racks. Framing member 70 is formed as a double thickness bulkhead and supports the forward end of the ovens. Framing member 71 forms the rear wall of the vehicle and is connected to the aft end of the ovens. Framing member 71 also supports the extension 66 and the cutting board 13.

In FIG. 4, the enclosure 54 is bounded by the tent material 73 which is attached at 56 to the vehicle side walls 43. The enclosure 54 has door flaps 53 on the left side and 57 on the right side of the vehicle. Identical doors are on the front of the enclosure (not shown).

Sanitation devices include the separate personnel hand sink 18 and the fluid dispensers 9, 12, and 27 which dispense alcohol based bactericides.

It can be seen that this particular layout of the various utilities results in a very efficient work place for the quick preparation of large quantities of food using a minimum number of people. Each operation in the food preparation chain can be accomplished separately and simultaneously within close proximity to the other allowing mutual support. The mobile kitchen can be staffed by three cooks. The three cooks can prepare a meal for about 315 people within two hours.

The mobile kitchen is approximately 30 feet long from the trailer hitch to the rear panel. The chassis is about 8 feet wide. It weights about 12,000 pounds. This lightweight vehicle and it's small prime mover can be operated by the same people that do the cooking. No specialized skill is needed, other than driving, to move the mobile kitchen to the place of it's use and set it up for operation. The vehicle is capable of moving at highway speeds over long distances with readily available towing vehicles. The set-up time is approximately 30 minutes from arrival on site until start of cooking. The mobile kitchen can be made in different sizes to accommodate larger or smaller groups of people. Obviously, smaller units could be moved by smaller prime movers.

The specific layout of the various utilities described in the specification may be arranged in different spaces, e.g. the burners may be at the rear with the ovens near the front, the sinks may be accessible from opposite sides to that disclosed, and the utility room may contain fewer or more of the fuel tanks and connections, all within the spirit of the invention.

I claim:

1. A mobile kitchen capable of rapid movement and set-up to prepare and serve hot meals in a minimum amount of time comprising an integrally constructed compartmentalized trailer with a front end, a rear end, an elongated left side and right side, a roof, and a chassis; said compartmentalized trailer being divided into a utility room for storage of fuel, foodstuffs, cooking utensils and personal gear; a primary cooking compartment housing an array of burners; a food preparation compartment housing a small sink for personnel, a large sink for washing foodstuffs, a convection oven and fuel and water tanks; a baking compartment housing ovens for baking or smoking; and a compartment housing a butcher block and rolling station.

2. A mobile kitchen of claim 1 wherein said utility room and each compartment is bounded by transverse bulkheads extending upwardly from said chassis to said roof, said bulkheads forming fire walls.

3. A mobile kitchen of claim 2 wherein said elongated left side and right side are connected to said roof by a hinge to open said compartmentalized trailer, said elongated left side and right side swing outwardly and upwardly exposing the compartments, said elongated left side and right side having means for supporting said sides in the open position.

4. A mobile kitchen of claim 3 wherein said primary cooking compartment includes a left side platform and a right side platform connected to said chassis through a hinge, said left side platform and right side platform swing outwardly and downwardly to provide a deck means for personnel support.

5. A mobile kitchen of claim 4 wherein said compartment housing said butcher block and rolling station is at the rear end of said trailer, said compartment having a forward wall and an end wall, said end wall composed of a lower wall means and an upper wall means releasably fastened together, said lower wall means attached to said chassis through a hinge, said lower wall means adapted to swing downwardly and provide a personnel deck, said upper wall means connected to said roof through a hinge, said upper wall means swings upwardly to provide shelter for the compartment, a butcher block attached to said forward wall by a hinged connection to fold downwardly into the operative position.

6. A mobile kitchen of claim 2 wherein said roof contains a vent extending continuously from said utility room through said primary cooking compartment, said food preparation compartment, and said baking compartment.

7. A mobile kitchen of claim 2 wherein said chassis has a trailer hitch and a leveler jack at said front end, said chassis connected to a wheel assembly means facilitating towing.

8. A mobile kitchen of claim 2 wherein said water tanks have filling ports and are connected to said sinks, said tanks being provided with a filter means for producing potable water.

9. A mobile kitchen of claim 2 wherein said primary cooking compartment has a fire suppression system means for extinguishing fires.

10. A mobile kitchen of claim 2 wherein said trailer has an electrical harness with an electrical buss located in said utility room, said buss providing a hook up to outside electrical power, electrical switches and circuit breakers, said harness including lighting fixtures for said compartments and surrounding area, said harness having receptacle means for attachment of additional appliances.

11. A mobile kitchen of claim 3 wherein said elongated left side and right side have means near the edges to releasibly fasten a flexible material forming an enclosure means about the periphery of said trailer to protect personnel from the elements.

12. A mobile kitchen of claim 2 wherein said primary cooking compartment is provided with stationary warming trays located above said burners and extending between said utility room bulkhead and the second bulkhead, said primary cooking compartment having swing out warming trays hingedly attached to said bulkheads.

13. A mobile kitchen capable of being towed into position, set up, and operated to produce approximately 300 hot meals within approximately 2½ hours comprising an elongated trailer having a roof and a chassis mounted on wheels, said chassis having a front end with trailer hitch means adapted for connection with a prime mover, said chassis including a plurality of transverse bulkheads extending upwardly and connected to said roof, said plurality of transverse bulkheads composed of fireproof materials, said trailer having a plurality of side panels swingably attached to said roof and enclosing the sides of said trailer, said side panels adapted to swing upwardly to expose the interior of said trailer, an enclosed utility room mounted on said chassis behind said hitch means, said utility room having a roof, front wall, left side wall, a right side wall and a rear wall integrally connected, an entry door on at least one of said side walls, said utility room including an integrally connected fuel tank, fire suppression supply with attached distribution means, and an electrical bus means for connection with an external electrical power source, said electrical bus means being connected to an electrical harness means for providing electrical lighting and outlets throughout said trailer, said rear wall being formed by a first transverse bulkhead of said plurality of transverse bulkheads, said first transverse bulkhead forming the forward boundry of a primary cooking compartment, a second transverse bulkhead of said plurality of transverse bulkheads forming the rear boundry of said primary cooking compartment, said primary cooking compartment having an array of burners, stationary warming trays, and movable warming trays attached to said first and second transverse bulkheads, said burners operatively connected to said fuel tank in said utility room, said second transverse bulkhead forming the forward boundry of a food preparation compartment and a third transverse bulkhead of said plurality of transverse bulkheads forming the rear boundry of said food preparation compartment, said food preparation compartment containing a hot water tank, cold water tank, fuel tank, convection oven, personnel sink, and a large sink adapted to receive foodstuffs, all integrally attached to said trailer, said personnel sink and said large sink operatively connected to said hot water tank and said cold water tank, said third transverse bulkhead forming the forward boundry of the baking or smoking compartment and a fourth transverse bulkhead of said plurality of transverse bulkheads forming the rear boundry of said baking or smoking compartment, said baking or smoking compartment containing a plurality of ovens attached to said chassis, and said third and fourth transverse bulkheads, said ovens operatively connected to said fuel tank in said food preparation compartment, said fourth transverse bulkhead forming the forward boundry of a chopblock and rolling compartment and a rear boundry formed by a movable partition having an upper portion and a lower portion releasably fastened together, said lower portion movably attached to said fourth transverse bulkhead and adapted to be lowered to form a deck, said upper portion movably attached to said fourth transverse bulkhead and adapted to be raised to form a roof extension, said chopblock and rolling compartment having a cutting board pivotably attached to said fourth transverse bulkhead.

\* \* \* \* \*